United States Patent [19]
Dunlap et al.

[11] Patent Number: 5,627,866
[45] Date of Patent: May 6, 1997

[54] FUEL ASSEMBLY STRUCTURE USING CHANNEL FOR LOAD SUPPORT

[75] Inventors: Thomas G. Dunlap; Robert B. Elkins; Christian D. Frederickson; Russell P. Higgins, all of Wilmington, N.C.

[73] Assignee: General Electric Company, Schenectady, N.Y.

[21] Appl. No.: 542,382

[22] Filed: Oct. 12, 1995

[51] Int. Cl.⁶ ..................................................... G21C 3/322
[52] U.S. Cl. ............................................ 376/446; 376/444
[58] Field of Search ..................................... 376/434, 444, 376/446, 448

[56] References Cited

U.S. PATENT DOCUMENTS

| | | |
|---|---|---|
| 3,015,616 | 1/1962 | Sturtz et al. . |
| 3,197,381 | 7/1965 | Blake . |
| 3,344,036 | 9/1967 | Haslam et al. . |
| 3,366,546 | 1/1968 | Anthony et al. . |
| 3,395,077 | 7/1968 | Long Sun Ton et al. . |
| 3,607,639 | 9/1971 | Hokasen et al. . |
| 3,697,376 | 10/1972 | Mefford et al. . |
| 3,968,008 | 7/1976 | Piepers et al. ............................ 376/446 |
| 3,992,259 | 11/1976 | Anthony et al. . |
| 4,038,137 | 7/1977 | Pugh . |
| 4,364,901 | 12/1982 | Feutrel . |
| 4,418,036 | 11/1983 | Gjertsen et al. . |
| 4,499,047 | 2/1985 | Borrman et al. . |
| 4,560,532 | 12/1985 | Barry et al. . |
| 4,578,241 | 3/1986 | Borrman et al. . |
| 4,587,093 | 5/1986 | Borrman et al. . |
| 4,588,550 | 5/1986 | Blomstrand et al. . |
| 4,632,804 | 12/1986 | Wallander et al. . |
| 4,652,426 | 3/1987 | Boyle et al. . |
| 4,666,664 | 5/1987 | Doshi . |
| 4,683,117 | 7/1987 | Carlson et al. . |
| 4,749,547 | 6/1988 | Blomstrand et al. . |
| 4,795,608 | 1/1989 | Nylund . |
| 4,895,697 | 1/1990 | Andersson et al. . |
| 5,255,300 | 10/1993 | Patterson et al. ......................... 376/444 |
| 5,327,471 | 7/1994 | Meier et al. . |
| 5,339,342 | 8/1994 | Meier et al. . |

FOREIGN PATENT DOCUMENTS

| | | |
|---|---|---|
| 0099323 | 1/1984 | European Pat. Off. . |
| 3533317A1 | 3/1987 | Germany . |

*Primary Examiner*—Daniel D. Wasil
*Attorney, Agent, or Firm*—Nixon & Vanderhye P.C.

[57] ABSTRACT

A fuel assembly for a nuclear reactor vessel includes a plurality of fuel rods, at least one coolant rod, a lower tie plate supporting the fuel rods and coolant rod, and a channel surrounding the fuel rods, coolant rod and tie plate. The lower tie plate is supported by the channel such that the channel carries a load of the fuel assembly. In one aspect of the invention, an upper tie plate includes two spring loaded latch pins engageable with corresponding apertures in the channel. A transition member supports the lower tie plate and is rigidly secured to the channel. Thus, when lifting the fuel assembly from the reactor, the channel bears the load of the fuel assembly. End gussets or clips are welded to the channel and inserted into the transition member, which serve as a secondary support for the transition member in the event that its primary connection to the channel fails. A channel guide member is secured to the upper tie plate and includes two ears that are received in ear apertures in the channel. The channel guide and ears thus provide a redundant attachment between the tie plate and the channel in the event that the spring loaded latch pins fail. If it is desired to remove the fuel bundle from the channel, the upper tie plate is released from the assembly by detaching the guide member and releasing the spring loaded latch pins. The bundle can then be removed from the channel by attaching a grapple head to the coolant rod ends, which are specially shaped to facilitate an attachment tool.

12 Claims, 4 Drawing Sheets

FUEL ASSEMBLY STRUCTURE USING CHANNEL FOR LOAD SUPPORT

TECHNICAL FIELD

This invention relates to the structure of a fuel assembly in a boiling water nuclear reactor vessel and, more particularly, to a fuel assembly structure that utilizes the channel to support its load, thereby eliminating the need for fuel tie rods.

BACKGROUND

A conventional fuel assembly in a boiling water nuclear reactor vessel includes a lower tie plate, an upper tie plate and a matrix of the sealed fuel rods supported between the upper and lower tie plates. The fuel rods contain nuclear fuel pellets in sealed containment for supporting a required critical reaction for the generation of steam. One or more coolant rods is included in the matrix of the fuel rods and is also supported between the upper and lower tie plates. A channel surrounds the tie plates, fuel rods and coolant rod. This channel is commonly square in cross-section and made of metal (preferably an alloy called Zircaloy). Water passes from the bottom of the fuel assembly to the top of the fuel assembly. Water enters through the lower tie plate within the channel and passes between the upstanding fuel rods. Water and generated steam exit from within the channel between the fuel rods and out through the upper tie plate. The channel confines the required moderator coolant flow to a flow path that is restricted between the tie plates.

The lower tie plate and the upper tie plate serve to support the sealed fuel rods in the vertical and upstanding matrix. Typically, the upper tie plate forms an overlying matrix of fuel rod support points. Into about eight of these support points are conventionally placed correspondingly male threaded tie rods and fittings. The tie rods, which contain fuel similar to the fuel rods, are threaded at their lower ends for corresponding attachment to the lower tie plate. The lower tie plate similarly forms an underlying matrix of fuel rod support points. These underlying support points correspond for the most part to the overlying support points of the upper tie plate. Conventionally, about eight of these support points are threaded with female apertures, which correspond to the overlying apertures in the upper tie plates. Into these threaded support points in the lower tie plates are placed the lower threaded ends of the fuel tie rods. Thus, conventionally, the two tie plates are tied together with the fuel tie rods.

The tie plates also define a matrix of apertures for permitting fluid flow into and out of the fuel assembly. Specifically, the lower tie plate defines a first matrix of apertures for permitting the in flow of water coolant. This coolant functions in the capacity of moderating or slowing down reaction produced fast neutrons to produce reaction continuing slow or thermal neutrons. At the same time, as the coolant passes upwardly through the fuel assembly within the channel, a portion of the coolant is turned to steam. This steam and the coolant that is not turned into steam and remains in the liquid phase must pass out through the upper tie plate. Consequently, the upper tie plate forms its own matrix of apertures in between its matrix of fuel rod support points. The upper tie plate matrix of apertures permits the out flow of the two phase steam/water mixture from the fuel assembly.

The fuel bundle must be periodically replaced and/or inspected during so-called "outages" of a reactor. These outages occur when the central steam generating core of a nuclear reactor has its overlying component removed to provide access through shielding water to the core. During such "outages," sections of the reactor vessel core are removed, inspected and/or replaced. The core, submerged in a radiation quenching bath of water, has the fuel bundles to be replaced for inspection removed by remotely grasping the fuel assembly at a handle. The handle must define, at the top of the fuel assembly, a support point for the entire weight of the fuel assembly in a depending relationship when the assembly is removed from the vessel. Once the fuel assembly is supported at the handle, the entire weight of the fuel assembly is carried through the handle. This weight includes the weight of the fuel and coolant rods, the weight of the upper tie plate, the weight of the lower tie plate and the weight of the surrounding channel (upwards of 600 pounds).

Once the fuel assembly is removed from the vessel, the tie plates, fuel rods and coolant rods can be separated from the channel. After separation from the channel, the fuel rods can easily be inspected and/or replaced. Conventionally, however, the threaded end plugs of the fuel tie rods tend to seize in their threaded connections, thus making replacement of the fuel tie rods difficult and time consuming. Moreover, as fuel assembly design lifetimes are extended, corrosion effects weaken the fuel tie rods. This weakening occurs due to corrosion thinning of the material and by a reduction in ductility due to the formation of hydrogen and its absorption.

Thus, there is a need to provide a fuel assembly structure that does not include fuel tie rods threadedly connected between the upper and lower tie plates. Moreover, there is a need to utilize a structural load path for the fuel assembly that is less affected by corrosion effects. In general, since corrosion is a surface phenomena, a structure with a high volume to surface area provides more margin in this regard. Without adding additional structure to the general design of boiling water reactor fuel assemblies, the component with the highest volume to surface area is the channel.

DISCLOSURE OF THE INVENTION

It is therefore an object of the invention to provide a fuel assembly structure that utilizes the channel as the structural member that limits the axial extension between the upper and lower tie plates. Another object of the invention is to provide a fuel assembly structure that provides redundancy in the attaching features of the upper tie plate to the channel as well as between the transition member and the channel and allows lifting of the assembly through a load path that does not utilize fuel tie rods that are threaded into the tie plates. It is yet another object of the invention to provide a method of removing the fuel bundle from the fuel assembly.

These and other objects and advantages of the invention are achieved by providing a fuel assembly for a nuclear reactor vessel that includes a plurality of fuel rods; a coolant rod; a channel surrounding the plurality of fuel rods and the coolant rod; and a lower tie plate supporting the plurality of fuel rods and the coolant rod, the lower tie plate being supported by the channel such that the channel carries a load of the fuel assembly.

The fuel assembly may further include an upper tie plate disposed inside the channel that laterally supports the plurality of fuel rods and the coolant rod; and connecting structure releasably connecting the upper tie plate and the channel. The upper tie plate may be provided with a bolt aperture adjacent the coolant rod that opens to a spring channel in the upper tie plate. In this regard, the fuel assembly further includes a coolant rod main spring disposed surrounding the coolant rod; a coolant rod main spring support supporting the coolant rod main spring; a bolt inserted in the bolt aperture and extending into the spring channel; a substantially cylindrical member fixed to an end of the bolt and delimiting the spring channel; and a spring disposed surrounding the bolt in the channel between the coolant rod main spring support and an end of the spring channel.

The connecting structure can include two opposed extendible and retractable latch pins, wherein the channel has a corresponding two opposed apertures for receiving the latch pins. The upper tie plate preferably has two boss members, which may be integral with the upper tie plate, each having a channel therein, wherein each of the latch pins is movably disposed in the each of the channels, respectively. Two springs may be provided, one each disposed in each of the channels surrounding a respective one of the latch pins. The springs urge the latch pins toward an extended position, the latch pins having a first outer periphery configured to be received in the apertures, respectively, and a second outer periphery, larger than the first outer periphery, configured to sit against the channel in the extended position. In this regard, each of the latch pins may include a spring engaging surface delimiting the channels, respectively, wherein the springs are disposed in the channels between an end surface of the channels and the spring engaging surfaces, respectively.

The fuel assembly may further include a transition member partially disposed in the channel and adjacent the lower tie plate. The transition member is attached to the channel, and the lower tie plate rests on the transition member in this regard, a bolt may be provided threadedly secured through the channel and the transition member. Still further, a channel clip may be provided fixed to the channel and inserted into a slot in the transition, wherein the channel clip is partially disposed axially interior of the channel, thereby restricting axial displacement of the transition member relative to the channel. In a preferred embodiment, four channel clips are welded to the channel.

In accordance with another aspect of the invention, the connecting structure includes a channel guide fixed to the upper tie plate and disposed outside of the channel. The channel guide includes an ear, and the channel includes a corresponding ear aperture configured to receive the ear. The channel guide may be provided with two arms disposed at substantially 90° and two ears, each fixed to a respective one of the two arms. The channel guide may include two legs extending from ends of the two arms, respectively, wherein the two ears are each fixed to one of the two legs, respectively.

In accordance with yet another aspect of the invention, there is provided a fuel assembly for a nuclear reactor vessel that includes a plurality of fuel rods; a coolant rod; a channel surrounding the plurality of fuel rods and the coolant rod; a lower tie plate supporting the plurality of fuel rods and the coolant rod, the lower tie plate being supported by the channel such that the channel carries a load of the fuel assembly; an upper tie plate disposed inside the channel and laterally supporting the plurality of fuel rods and the coolant rod; a transition member partially disposed in the channel and adjacent the lower tie plate, the transition member being attached to the; channel, wherein the lower tie plate rests on the transition member; and connecting structure releasably connecting the upper tie plate and the channel, wherein the connecting structure includes a channel guide fixed to the upper tie plate and disposed outside of the channel, the channel guide including an ear, and the channel including a corresponding ear aperture configured to receive the ear.

The connecting structure may further include an extendible and retractable latch pin, and the channel may include a corresponding aperture for receiving the; latch pin.

Finally, in accordance with a further aspect of the invention, there is provided a method of removing a fuel bundle from a fuel assembly, the fuel bundle including a plurality of fuel rods, a coolant rod, and a lower tie plate supporting the plurality of fuel rods and the coolant rod, the coolant rod being fixed to the lower tie plate. The fuel assembly includes a channel surrounding the fuel bundle, and the lower tie plate is supported by the channel such that the channel carries a load of the fuel assembly. The method includes detaching the lower tic; plate from being supported by the channel; and removing the fuel bundle by lifting the coolant rod with a lifting tool.

The fuel assembly may further include an upper tie plate disposed inside of the channel and laterally supporting the plurality of fuel rods and the coolant rod, and connecting structure releasably connecting the upper tie plate and the channel. In this regard, the detaching step may include removing the connecting structure to detach the upper tie plate and the channel.

BRIEF DESCRIPTION OF THE DRAWINGS

These and other aspects and advantages of the present invention will become apparent from the following detailed description of preferred embodiments when taken in conjunction with the accompanying drawings, in which.

BEST MODE FOR CARRYING OUT THE INVENTION

Figure 1:
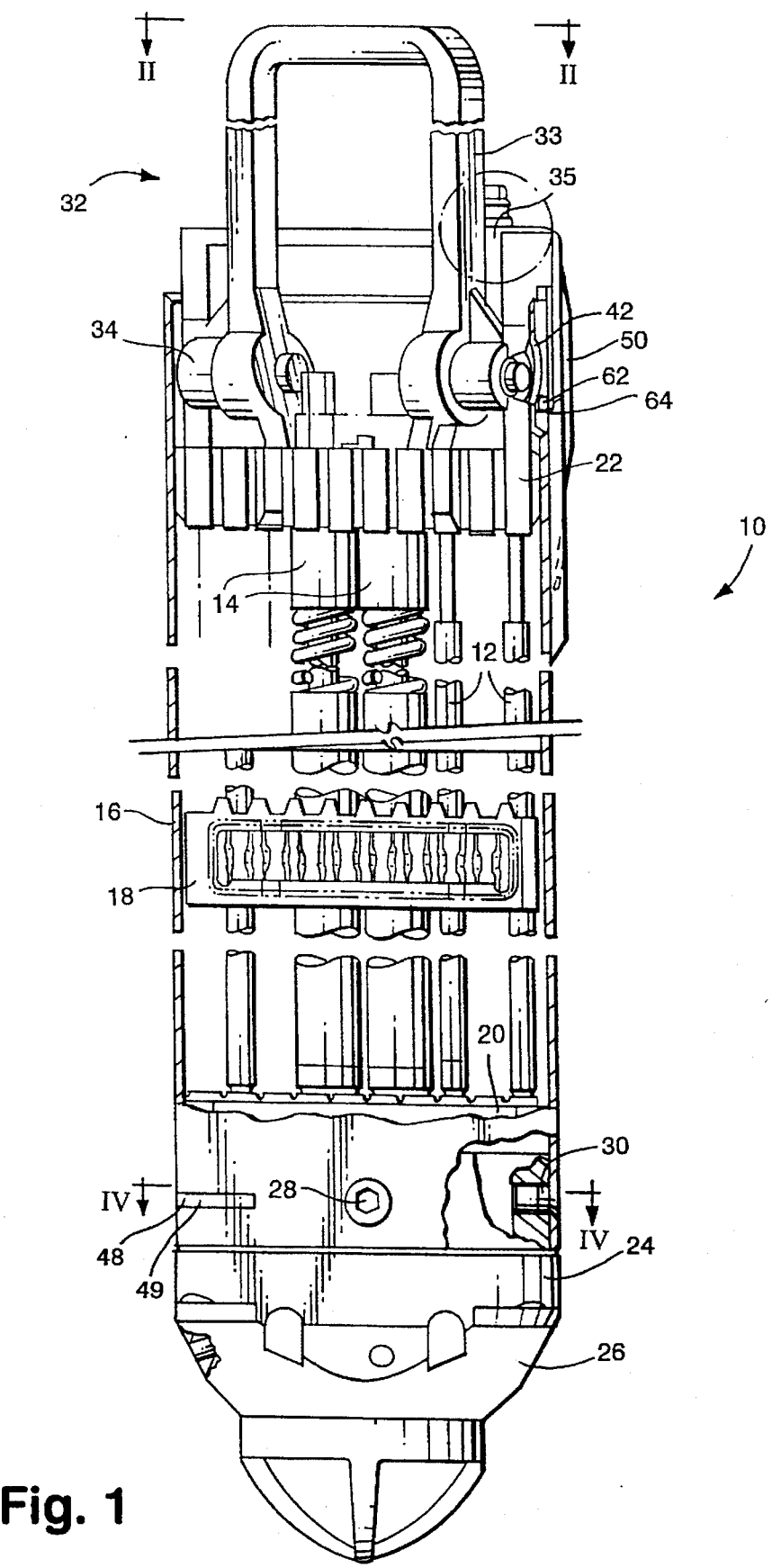
FIG. 1 is a cross-sectional view of a fuel assembly according to the invention.

FIG. 1 is a cross-section of a fuel assembly for a boiling water nuclear reactor in accordance with the present invention. The fuel assembly 10 includes a plurality of fuel rods 12, a pair of coolant rods 14 (two coolant rods 14 are illustrated and described in the preferred embodiment, however, a single coolant rod is often used in such fuel assemblies), and a channel 16 surrounding the fuel rods 12 and coolant rods 14. The fuel rods 12 are preferably arranged in a 10×10 matrix and are secured against lateral movement in the channel by a plurality of spacers 18. The coolant rods 14 are generally centrally disposed in the fuel rod matrix. Small holes are provided at both the lower and upper ends of the coolant rods 14 allowing water to be driven through the rod, thus introducing moderating material within the fuel rod matrix. One water rod also serves as the spacer-capture rod being mechanically locked to each of the spacers 18, thereby fixing the axial position of each spacer 18. The fuel rod spacers 18 are equipped with Inconel-X springs to maintain rod to rod spacing.

The fuel rods 12 and the coolant rods 14 are supported by a lower tie plate 20. An upper tie plate 22 receives the fuel rods 12 and the coolant rods 14 and restricts lateral movement. End plugs of the fuel rods have pins that fit into anchor holes in the tie plates 20, 22. An expansion space located over the top end plug of each fuel rod allows them to expand axially by sliding within the holes in the upper tie plate to accommodate differential axial thermal expansion. In contrast with the conventional structure, none of the fuel rods is threaded into the lower tie plate 20 or the upper tie plate 22. One or both of the coolant rods 14 may be securely threaded into the lower tie plate 20. As discussed above in connection with the prior art, it is not desirable to thread anything into the tie plates 20, 22 as the threads tend to seize over extended submersion times. In contrast with the fuel rods 12, however, the coolant rods 14 need not be removed from the bundle nearly as frequently as the fuel rods 12. Thus, in the present invention, the coolant rods 14 are threaded or otherwise securely attached to one or both of the tie plates 20, 22.

A transition member 24 supports the lower tie plate 20 in the channel 16 and serves as a transition to the nose piece 26. The channel 16 is secured to the transition member 24 by any suitable structure. In the illustrated embodiment, a bolt 28 is threaded through the channel and into the transition member 24. Four bolts 28 are preferably threaded one each through each side of the substantially square cross-section of the channel 16. The transition member 24 has corresponding threaded bolt receiving holes 30 in each side of its corresponding square cross-section. The bolts 28 are preferably formed of alloy X-750.

Figure 2:
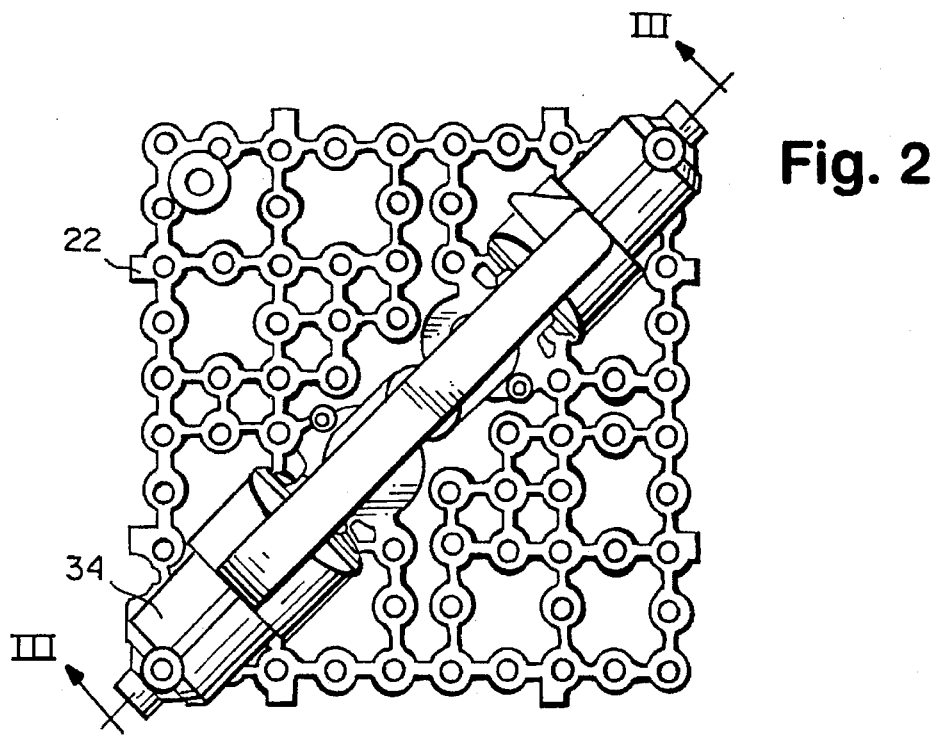
FIG. 2 is a view along line II—II in FIG. 1.
Figure 3:
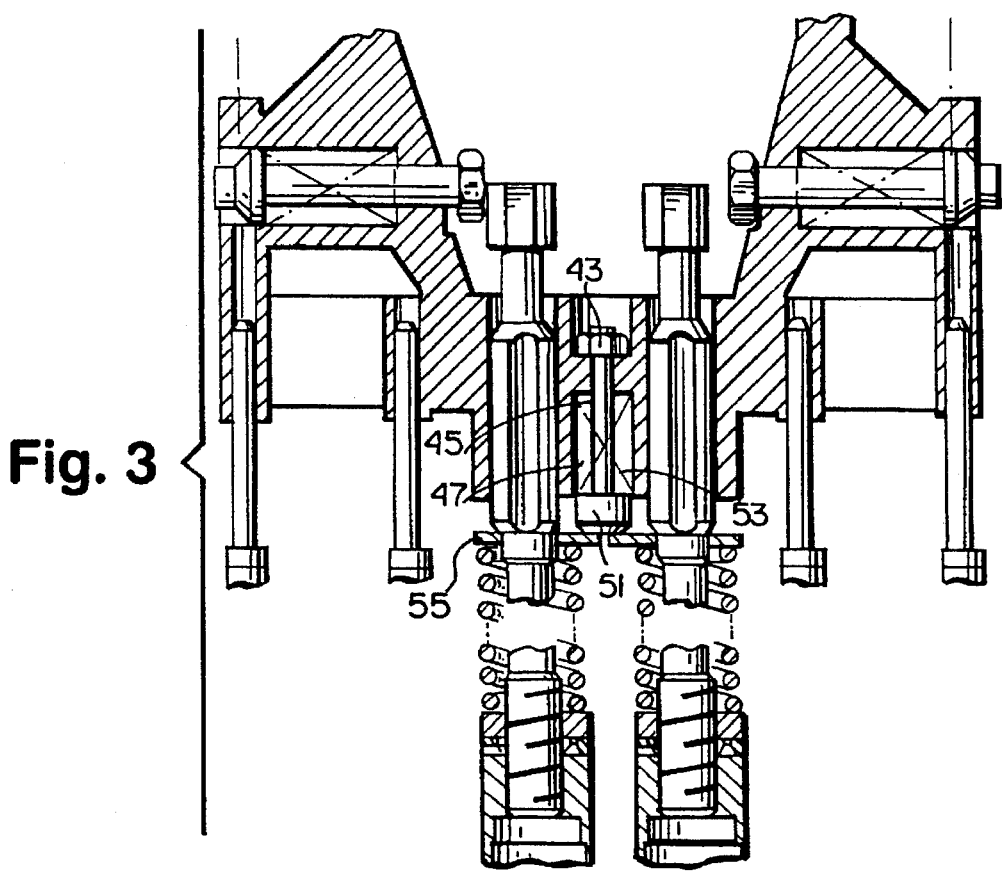
FIG. 3 is a cross-sectional view through line III—III in FIG. 2.

Integral with the upper tie plate 22 is a bail handle assembly 32. Referring to FIGS. 1 and 2, the bail handle assembly 32 includes a bail handle 33 and two boss members 34. FIG. 3 is a cross-section through line III—111 in FIG. 2. The boss members 34 include a channel 36 formed therein. A latch pin 38 is movably disposed in the channel 36. A latch pin cap 40 is fixed to an outer end of the latch pin 38 and has a first outermost diameter that is configured to be extendible through a latch pin aperture 42 in the channel 16 and a second innermost diameter that is larger than the latch pin aperture 42 in the channel 16 and that serves as a stop surface for the latch pin 38. An inside surface of the latch pin cap 40 delimits the channel 36 in the boss members 34. A spring 44 is disposed around the latch pin 38 in the channel 36 between the inside surface of the latch pin cap 40 and an end of the channel 36. The spring 44 urges the latch pin 38 to an extended position, engaging the latch pin aperture 42 in the channel 16.

In operation, because the transition member 24 is rigidly secured to the channel 16 by means of the bolt 28 and because the latch pin 38 is inserted into the latch pin aperture 42 in the channel 16, when lifting the fuel assembly 10 with the bail handle assembly 32, the channel 16 bears the structural load of the fuel assembly 10. As noted above, the channel 16 has the highest volume to surface area of the components in the fuel assembly 10 and better avoids the effects of corrosion.

With continued reference to FIG. 3, a bolt 43 is disposed between the water rods 14 in an aperture 45 in the upper tie plate 22. The bolt 43 extends into a channel 47. A substantially cylindrical member 51 is fixed to the end of the bolt 43 and delimits the channel 47. A spring 53 is disposed surrounding the bolt 43 in the space delimited by the cylindrical member 51 and the top of the channel 47. The spring 53 serves to maintain the upper tie plate 22 spaced from the water rod main spring supports 55 as illustrated in FIG. 3. Moreover, the spring 53 urges the upper tie plate 22 upward such that the latch pins engage an upper end of the latch pin apertures 42. Still further, preload forces of the water rod main springs are diverted from the upper tie plate 22.

Figure 4:
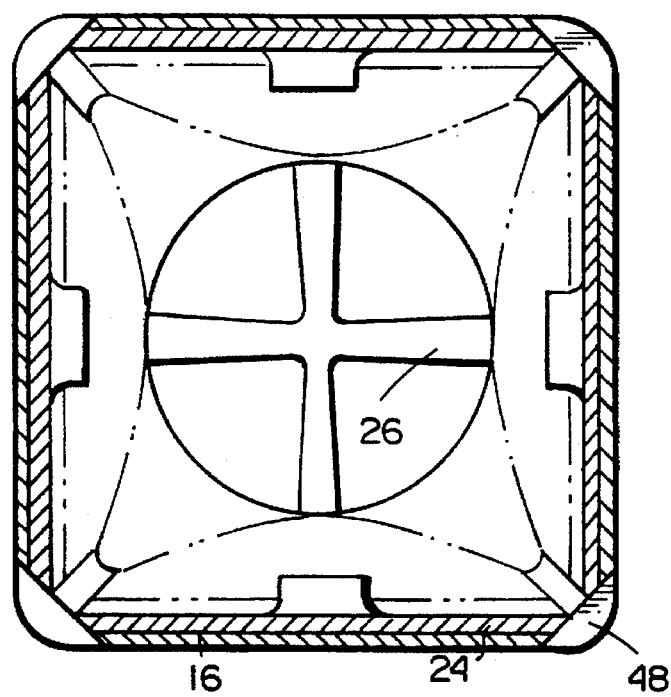
FIG. 4 is a bottom view of the fuel assembly according to the invention.

FIG. 4 is a cross sectional view through line IV—IV in FIG. 1. Through the channel 16 adjacent the transition member 24 are provided a plurality of end gussets or clips 48 that are attached to the channel 16 and that are inserted into corresponding slots 49 in the transition member 24. The clips 48 serve as a backup support for the assembly in the event that the bolts 28 fail. In a preferred embodiment, four end clips 48 are provided, one each attached to each corner of the channel 16. The end clips 48 are preferably welded to the channel.

Figure 7:
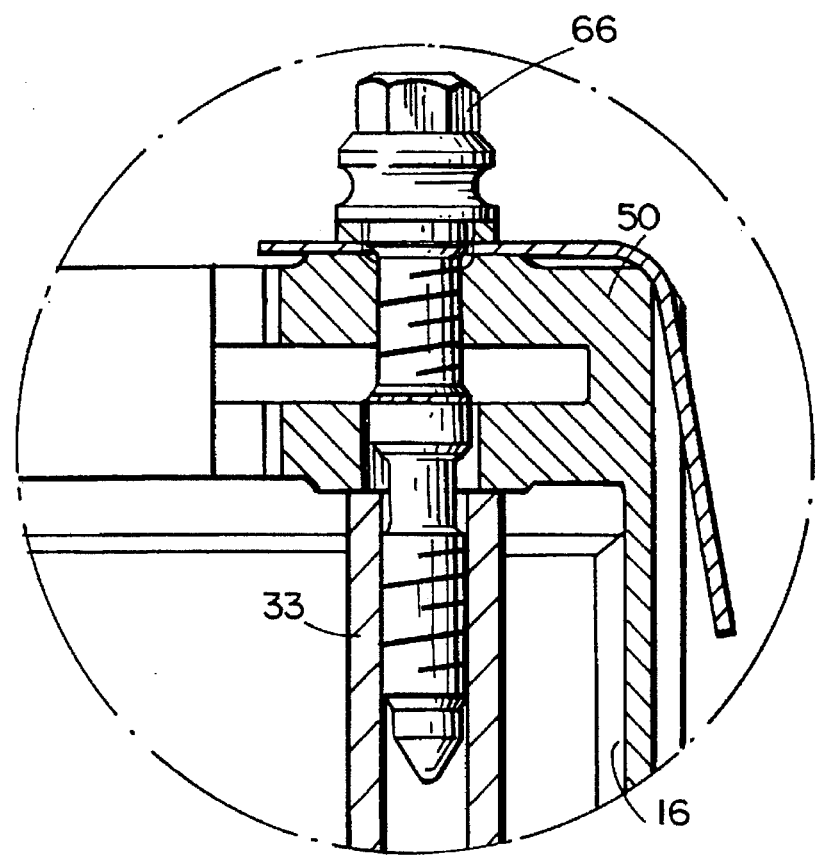
FIG. 7 illustrates the connecting structure for connecting the channel guide to the upper tie plate.
Figure 5:
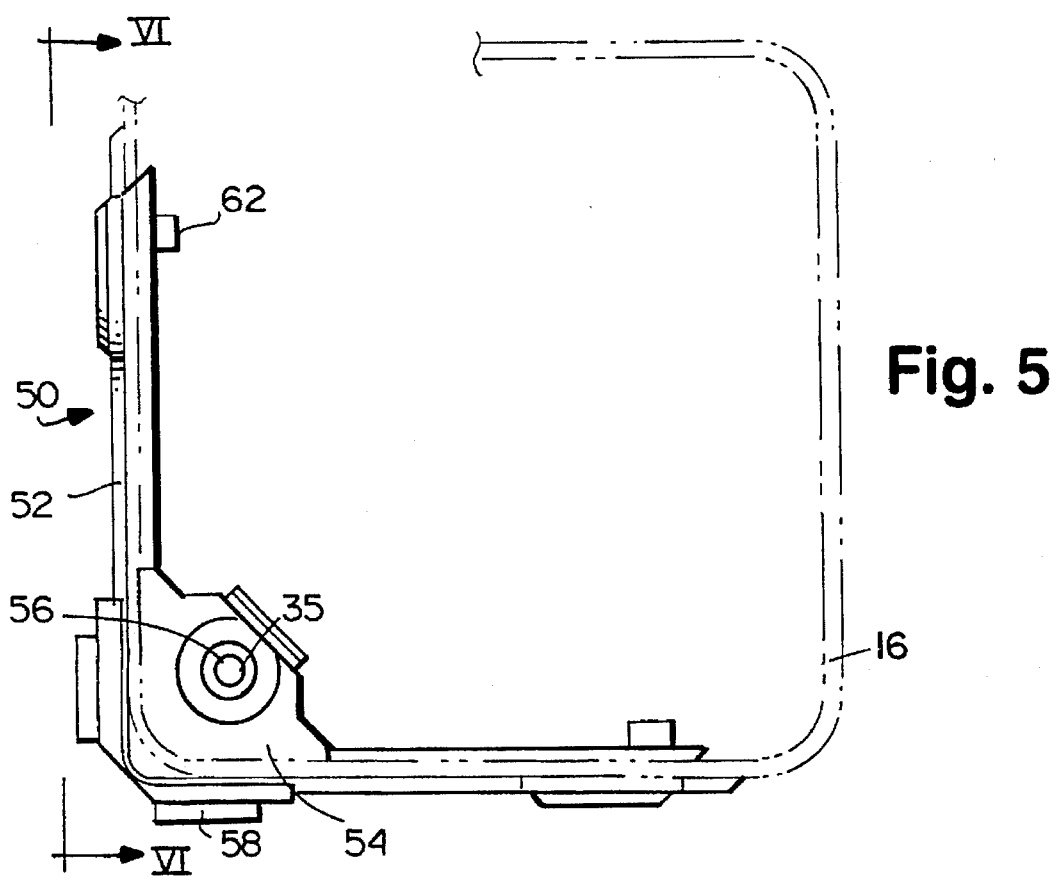
FIG. 5 is a plan view of the channel guide according to the invention.

FIG. 5 illustrates a channel guide 50 according to the present invention. The channel guide 50 includes two channel guide arms 52 disposed substantially at 90°. A center plate 54 is disposed substantially between the arms 52. The center plate 54 consists of a gusset having a threaded, aperture 56 therein. The channel guide 50 is configured to surround the channel 16 and is mounted by the aperture 56 in the center plate 54 to a corner post 35 of the upper tie plate 22 with a bolt 66. The corner post 35 is integral with the upper tie plate 22. The bolt 66 securing the channel guide 50 to the corner post 35 of the upper tie plate 22 is illustrated in FIG. 7.

Figure 6:
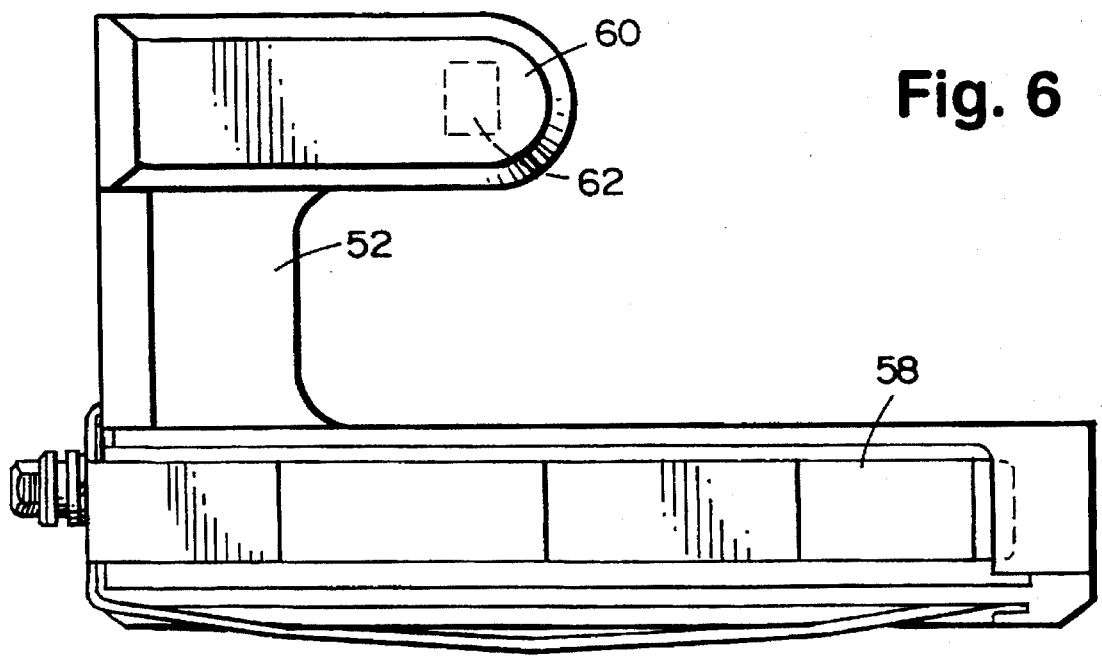
FIG. 6 is a side view of the channel guide along line VI—VI in FIG. 5.

Referring to FIG. 6, two spring leaves 58 are disposed in the vicinity of the center plate 54 and are adapted to support the channel guide 50 along the channel 16. At an end of each of the arms 52 is provided a leg 60 configured to extend in the same direction along the channel 16 as the spring leaves 58. An ear 62 protrudes from each leg 60 toward the channel 16. Referring to FIG. 1, the channel also includes ear apertures 64 configured to receive the ears 62. The ear apertures 64 are sized slightly larger than the ears 62 both in the longitudinal direction and the axial direction to enable the ears 62 to be freely inserted into and removed from the ear apertures 64 and to accommodate differential axial thermal expansion. The ears 62 and ear apertures 64 thus provide a redundant support between the upper tie rod 22 and the channel 16 in the event that the spring loaded latch pins 38 fail.

If it is desired to remove the upper tie plate from the assembly, the bolt 66 is removed from the corner post 35 of the upper tie plate 22, and the channel guide 50 is removed. The latch pins 38 are then compressed against the force of springs 44, either manually or using a tool, and the tie plate is lifted from the assembly using the bail handle 33. The fuel bundle can then be removed from the channel 16 by attaching a known grapple head to the coolant rod ends, which are specially shaped to facilitate an attachment tool.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel assembly for a nuclear reactor vessel, the fuel assembly comprising:
   a plurality of fuel rods;
   at least one coolant rod;
   a channel surrounding said plurality of fuel rods and said at least one coolant rod;
   a lower tie plate supporting said plurality of fuel rods and said at least one coolant rod, said lower tie plate being supported by said channel such that said channel carries a load of said fuel assembly;

an upper tie plate disposed inside said channel and laterally supporting said plurality of fuel rods and said at least one coolant rod; and connecting structure releasably connecting said upper tie plate and said channel, wherein said connecting structure comprises at least one extendible and retractable latch pin, said channel comprising a corresponding at least one aperture for receiving said latch pin, wherein said upper tie plate comprises a bolt aperture adjacent said coolant rod that opens to a spring channel in said upper tie plate, the fuel assembly further comprising:

a coolant rod main spring disposed surrounding said coolant rod, a coolant rod main spring support supporting said coolant rod main spring, a bolt inserted in said bolt aperture and extending into said spring channel, a substantially cylindrical member fixed to art end of said bolt and delimiting said spring channel, and a spring disposed surrounding said bolt in said channel between said coolant rod main spring support and an end of said spring channel.

2. A fuel assembly according to claim 1, wherein said connecting structure comprises two opposed extendible and retractable latch pins, said channel comprising a corresponding two opposed apertures for receiving said latch pins.

3. A fuel assembly according to claim 2, wherein said upper tie plate comprises two boss members each having a channel therein, each of said latch pins being movably disposed in said each of said channels, respectively.

4. A fuel assembly according to claim 3, further comprising two springs, one each disposed in each of said channels surrounding a respective one of said latch pins and urging said latch pins toward an extended position, said latch pins having a first outer periphery configured to be received in said apertures, respectively, and a second outer periphery, larger than said first outer periphery, configured to sit adjacent said channel in the extended position.

5. A fuel assembly according to claim 4, wherein each of said latch pins comprises a spring engaging surface delimiting said channels, respectively, said springs being disposed in said channels between an end surface of said channels and said spring engaging surfaces, respectively.

6. A fuel assembly according to claim 3, wherein said boss members are integral with said upper tie plate.

7. A fuel assembly according to claim 1, wherein said connecting structure comprises a channel guide fixed to said upper tie plate and disposed outside of said channel, said channel guide including at least one ear, wherein said channel comprises a corresponding at least one ear aperture configured to receive said at least one ear.

8. A fuel assembly according to claim 7, wherein said channel guide comprises two arms disposed at substantially 90° and two ears, each fixed to a respective one of said two arms.

9. A fuel assembly according to claim 8, wherein said channel guide comprises two legs extending from ends of said two arms, respectively, said two ears each being fixed to one of said two legs, respectively.

10. A fuel assembly for a nuclear reactor vessel, the fuel assembly comprising:

a plurality of fuel rods;

at least one coolant rod;

a channel surrounding said plurality of fuel rods and said at least one coolant rod;

a lower tie plate supporting said plurality of fuel rods and said at least one coolant rod, said lower tie plate being supported by said channel such that said channel carries a load of said fuel assembly;

a transition member partially disposed in said channel and adjacent said lower tie plate, said transition member being attached to said channel, wherein said lower tie plate rests on said transition member;

at least one bolt threadedly secured through said channel and said transition member; and at least one channel clip fixed to said channel and inserted into a slot in said transition member, said at least one channel clip being partially disposed axially interior of said channel, thereby restricting axial displacement of said transition member relative to said channel.

11. A fuel assembly according to claim 10, comprising four channel clips fixed to each corner of said channel.

12. A fuel assembly according to claim 11, wherein said channel clips are welded to said channel.

* * * * *